United States Patent
Wang et al.

(10) Patent No.: US 12,118,781 B2
(45) Date of Patent: Oct. 15, 2024

(54) METHOD AND DEVICE FOR DETERMINING EXTRACTION MODEL OF GREEN TIDE COVERAGE RATIO BASED ON MIXED PIXELS

(71) Applicant: The Second Institute of Oceanography (SIO), MNR, Hangzhou (CN)

(72) Inventors: Difeng Wang, Hangzhou (CN); Xiaoguang Huang, Hangzhou (CN); Fang Gong, Hangzhou (CN); Yan Bai, Hangzhou (CN); Xianqiang He, Hangzhou (CN)

(73) Assignee: THE SECOND INSTITUTE OF OCEANOGRAPHY (SIO), MNR, Hangzhou (CN)

( * ) Notice: Subject to any disclaimer, the term of this patent is extended or adjusted under 35 U.S.C. 154(b) by 728 days.

(21) Appl. No.: 17/373,111

(22) Filed: Jul. 12, 2021

(65) Prior Publication Data
US 2022/0129674 A1  Apr. 28, 2022

(30) Foreign Application Priority Data
Oct. 23, 2020 (CN) .......................... 202011143268.2

(51) Int. Cl.
*G06V 20/10* (2022.01)

(52) U.S. Cl.
CPC .................................. *G06V 20/188* (2022.01)

(58) Field of Classification Search
CPC ............... G06V 20/188; G06V 20/194; G06T 2207/30188; G01N 33/1826; G01C 13/00
See application file for complete search history.

(56) References Cited

U.S. PATENT DOCUMENTS

| 2012/0155714 A1* | 6/2012 | Douglass ............. G06V 10/143 382/110 |
| 2015/0016668 A1 | 1/2015 | Cheriyadat et al. |
| 2024/0159688 A1* | 5/2024 | Oudrhiri ................ G01N 22/04 |

FOREIGN PATENT DOCUMENTS

| CN | 103063202 A | * 4/2013 |
| CN | 104360351 A | 2/2015 |

(Continued)

OTHER PUBLICATIONS

Son et al., 2012, "Detecting Massive Green Algae (*Ulva prolifera*) Blooms in the Yellow Sea and East China Sea using Geostationary Ocean Color Imager (GOCI) Data" (pp. 359-375) (Year: 2012).*

(Continued)

*Primary Examiner* — Manav Seth
(74) *Attorney, Agent, or Firm* — Brooks Kushman P.C.

(57) ABSTRACT

A method and a device for determining an extraction model of a green tide coverage ratio based on mixed pixels. The method includes acquiring sample truth values respectively corresponding to a plurality of target regions water body and green tide; acquiring a plurality of first remote sensing data of a first satellite sensor, the plurality of remote sensing data are in one-to-one correspondence with the plurality of target regions; determining reflection index sets respectively corresponding to the plurality of target regions according to the plurality of remote sensing data; and determining the extraction model of the green tide coverage ratio corresponding to the first satellite sensor according to the sample truth value corresponding to each of the plurality of target regions and the reflection index set corresponding to each of the plurality of target regions.

11 Claims, 6 Drawing Sheets

(56) References Cited

FOREIGN PATENT DOCUMENTS

| CN | 106971146 | A | * | 7/2017 |
| CN | 105427305 | B | * | 12/2018 |
| CN | 109389065 | A | | 2/2019 |
| CN | 109781626 | A | | 5/2019 |
| CN | 109871774 | A | | 6/2019 |
| CN | 110501302 | A | * | 11/2019 |

OTHER PUBLICATIONS

Visitacion et al., 2019, "Detection of Algal Bloom in the Coastal Waters of Boracay, Philippines Using Normalized Difference Vegetation Index (NDVI) and Floating Algae Index (FAI)". (pp. 479-486). (Year: 2019).*

Liang et al., 2019, "Automatic Remote Sensing Detection of Floating Macroalgae in the Yellow and East China Seas Using Extreme Learning Machine". (pp. 272-281) (Year: 2019).*

* cited by examiner

METHOD AND DEVICE FOR DETERMINING EXTRACTION MODEL OF GREEN TIDE COVERAGE RATIO BASED ON MIXED PIXELS

CROSS-REFERENCE TO RELATED APPLICATIONS

The present application claims the benefits of Chinese Patent Application, with Application No. 202011143268.2, filed on Oct. 23, 2020; the entire content of which is incorporated herein by reference.

TECHNICAL FIELD

The present application relates to the technical field of remote sensing monitoring of water environment, and more particularly to a method and a device for determining an extraction model of a green tide coverage ratio based on mixed pixels.

BACKGROUND

Green tide is a harmful ecological phenomenon in which certain large green algae (such as enteromorpha) explosively proliferate or highly aggregate in seawater under specific environmental conditions, causing the water body to change color. Green tide monitoring is an important part of marine ecosystem management.

Currently, satellite remote sensing monitoring is widely used in green tide monitoring. It collects satellite images through quasi-synchronous satellite sensors with different spatial resolutions, and interprets the distribution of green tides based on object-oriented image segmentation and classification techniques. The large-scale, multi-frequency dynamic monitoring of green tides is implemented, and provides decision-making support for timely disposal of green tide disasters.

Currently, remote sensing satellites with medium and low spatial resolution have a wide coverage and high time resolution, which can monitor the outbreak of green tide in a timelier manner. However, due to the problem of mixed pixels, when remote sensing satellites with medium and low spatial resolution are used for detecting green tide, a small number of mixed pixels containing green tide are ignored, and most of the mixed pixels containing green algae will be recognized as pure green tide pixels, which makes the monitored green tide coverage ratio much overestimated. As a result, the green tide coverage ratio error under the mixed pixels extracted by the satellite remote sensing technology based on the medium and low spatial resolution in the prior art is relatively large.

SUMMARY

Embodiments of the present application provide a method and a device for determining an extraction model of a green tide coverage ratio based on mixed pixels, to solve the problem that the green tide coverage ratio error under the mixed pixels extracted by the satellite remote sensing technology based on the medium and low spatial resolution in the prior art is relatively large.

In a first aspect, an embodiment of the present application provides a method for determining an extraction model of a green tide coverage ratio based on mixed pixels, which includes:

acquiring sample truth values respectively corresponding to a plurality of target regions; each target region contains water body and green tide, and each sample truth value is a truth value of the green tide coverage ratio in each target region;

acquiring a plurality of first remote sensing data of a first satellite sensor; the plurality of remote sensing data are in one-to-one correspondence with the plurality of target regions;

determining reflection index sets respectively corresponding to the plurality of target regions according to the plurality of remote sensing data, each reflection index set includes a plurality of reflection indexes, and each reflection index is configured to represent an extracted value of the green tide coverage ratio in a pixel; and determining the extraction model of the green tide coverage ratio corresponding to the first satellite sensor according to the sample truth value corresponding to each of the plurality of target regions and the reflection index set corresponding to each of the plurality of target regions.

In an implementation manner of the first aspect, the acquiring the sample truth values respectively corresponding to the plurality of target regions includes:

acquiring a plurality of second remote sensing data of a second satellite sensor; a spatial resolution of the second satellite sensor is higher than a spatial resolution of the first satellite sensor; and the plurality of second remote sensing data are in one-to-one correspondence with the plurality of first remote sensing data; and determining the sample truth value of the target region corresponding to each of the plurality of second remote sensing data.

In an implementation manner of the first aspect, the determining the sample truth value of the target region corresponding to each of the plurality of second remote sensing data includes:

determining a color composite image of the target region corresponding to a candidate second remote sensing data and a normalized vegetation index of each pixel contained in the candidate second remote sensing data according to the candidate second remote sensing data; the candidate second remote sensing data is any one of the plurality of remote sensing data; and the color composite image contains distribution information of the green tide in the target region;

determining a type of each pixel according to a first threshold value and the normalized vegetation index of each pixel; the type is a mixed pixels or a pure water pixel, and an object represented by the mixed pixels simultaneously contains the water body and the green tide;

generating an extraction result image of the target region corresponding to the candidate second remote sensing data according to the type of each pixel; the extraction result image contains the distribution information of the green tide in the target region;

comparing the extraction result image with the color composite image, and updating the first threshold value according to a comparison result to acquire a second threshold value;

updating the extraction result image based on the second threshold value to generate an updated extraction result image, distribution information of the green tide of the updated extraction result image is consistent with the distribution information of the green tide of the color composite image; and determining the sample truth value of the target region corresponding to the candidate second remote sensing data according to the updated extraction result image.

In an implementation manner of the first aspect, the determining the extraction model of the green tide coverage ratio corresponding to the first satellite sensor according to the sample truth value corresponding to each of the plurality of target regions and the reflection index set corresponding to each of the plurality of target regions includes:

for each target region of the plurality of target regions, determining the green tide coverage ratio of the plurality of pixels contained in the first satellite sensor at the target region according to the sample truth value of the target region;

generating a plurality of sample arrays of the target region according to the reflection index set of the target region and the green tide coverage ratio of the plurality of pixels;

performing a fitting processing on the sample arrays of all the pixels in the plurality of target regions to generate a correlation relationship between the reflection index set and the green tide coverage ratio; and determining the extraction model of the green tide coverage ratio corresponding to the first satellite sensor according to the correlation relationship.

In an implementation manner of the first aspect, the reflection index includes a normalized vegetation index.

In a second aspect, an embodiment of the present application provides a method for determining a green tide coverage ratio, the method includes:

acquiring a plurality of third remote sensing data of a first remote sensing satellite in a region to be tested; the plurality of third remote sensing data are in one-to-one correspondence with a plurality of time points, and the a duration time between the plurality of time points is greater than a third threshold value;

determining reflection indices of a plurality of pixels contained in the region to be tested according to the plurality of third remote sensing data;

inputting the reflection indices of the plurality of pixels into an extraction model of a green tide coverage ratio of the first remote sensing satellite to acquire corresponding a plurality of green tide coverage ratios; the extraction model of the green tide coverage ratio is a model determined based on any one of above methods of the first aspect; and determining a change trend of the green tide coverage ratios of the region to be tested according to the plurality of green tide coverage ratios.

In a third aspect, an embodiment of the present application provides a device for determining an extraction model of a green tide coverage ratio based on mixed pixels, which includes:

a truth value acquiring module, configured for acquiring sample truth values respectively corresponding to a plurality of target regions; each target region contains water body and green tide, and each sample truth value is a truth value of the green tide coverage ratio in each target region;

a first data acquiring module, configured for acquiring a plurality of first remote sensing data of a first satellite sensor; the plurality of remote sensing data are in one-to-one correspondence with the plurality of target regions;

a first index determining module, configured for determining reflection index sets respectively corresponding to the plurality of target regions according to the plurality of remote sensing data, each reflection index set comprises a plurality of reflection indexes, and each reflection index is configured to represent an extracted value of the green tide coverage ratio in a pixel; and a model determining module, configured for determining the extraction model of the green tide coverage ratio corresponding to the first satellite sensor according to the sample truth value corresponding to each of the plurality of target regions and the reflection index set corresponding to each of the plurality of target regions.

In a fourth aspect, an embodiment of the present application provides a device for determining a green tide coverage ratio, which includes:

a second data acquiring module, configured for acquiring a plurality of third remote sensing data of a first remote sensing satellite in a region to be tested; the plurality of third remote sensing data are in one-to-one correspondence with a plurality of time points, and the a duration time between the plurality of time points is greater than a third threshold value;

a second index determining module, configured for determining reflection indices of a plurality of pixels contained in the region to be tested according to the plurality of third remote sensing data;

a coverage ratio determining module, configured for inputting the reflection indices of the plurality of pixels into an extraction model of a green tide coverage ratio of the first remote sensing satellite to acquire corresponding a plurality of green tide coverage ratios; wherein the extraction model of the green tide coverage ratio is a model determined based on the methods of the second aspect; and a trend determining module, configured for determining a change trend of the green tide coverage ratios of the region to be tested according to the plurality of green tide coverage ratios.

In a fifth aspect, an embodiment of the present application provides a terminal device, which includes a memory, a processor, and a computer program stored in the memory and capable of running on the processor; when the processor executes the computer program, steps of any one of above methods of the first aspect or steps of the methods of the second aspect are implemented.

In a sixth aspect, an embodiment of the present application provides a computer-readable storage medium, the computer-readable storage medium storing a computer program, wherein when the computer program is executed by a processor, steps of any one of above methods of the first aspect or steps of the methods of the second aspect are implemented.

In a seventh aspect, an embodiment of the present application provides a computer program product, when the computer program product operates on a terminal device, causing the terminal device to execute the method of any one of the above-mentioned in the first aspect, or execute the method of the above-mentioned in the second aspect In the method for determining an extraction model of a green tide coverage ratio based on mixed pixels provided by embodiments of the present application, the extraction model of the green tide coverage ratio corresponding to the first satellite sensor is determined according to the sample truth values respectively corresponding to the plurality of target regions and the reflection index sets respectively corresponding to the plurality of target regions. Since the sample truth value is the truth value of the green tide coverage ratio of each target region, such that the extracted value of the green tide coverage ratio obtained based on the first satellite sensor can be corrected based on the extraction model of the green tide coverage ratio. Thereby the coverage ratio of multiple green tides in the region to be detected can be determined. The extraction model of the green tide coverage ratio is used to correct the extracted value of the green tide coverage ratio extracted based on the remote sensing data of the satellites with low and medium resolution in the prior art, which greatly reduces the error of the remote sensing detection of the green tide coverage ratio of the satellites with low and medium resolution. In this way, the green tide coverage ratio in the region to be tested can be directly estimated based on the remote sensing detection data of the satellites with low and medium resolution.

Further areas of applicability will become apparent from the description provided herein. The description and specific examples in this summary are intended for purposes of illustration only and are not intended to limit the scope of the present disclosure.

DRAWINGS

In order to explain the embodiments of the present invention more clearly, a brief introduction regarding the accompanying drawings that need to be used for describing the embodiments of the present invention or the prior art is given below; it is obvious that the accompanying drawings described as follows are only some embodiments of the present invention, for those skilled in the art, other drawings can also be obtained according to the current drawings on the premise of paying no creative labor.

Corresponding reference numerals indicate corresponding parts throughout the several views of the drawings.

DETAILED DESCRIPTION

In the following description, for the purpose of illustration rather than limitation, specific details such as a specific system structure and technology are proposed for a thorough understanding of the embodiments of the present application. However, it should be clear to those skilled in the art that the present application can also be implemented in other embodiments without these specific details. In other cases, detailed descriptions of well-known systems, devices, circuits, and methods are omitted to avoid unnecessary details from obstructing the description of this application.

The reference to "an embodiment" or "some embodiments" described in the specification of the present application means that one or more embodiments of the present application include a specific feature, structure, or characteristic described in combination with the embodiment. Therefore, the words "in an embodiment", "in some embodiments", "in some other embodiments", "in some further embodiments", etc. appearing in different places in the present specification are not necessarily all refer to the same embodiment, but mean "one or more but not all embodiments" unless it is specifically emphasized otherwise. The terms "comprising", "containing", "having" and their variations all mean "including but not limited to", unless otherwise specifically emphasized.

In the field of satellite remote sensing technology, mixed pixels refer to pixels that contain both green tide algae and sea water. Studies have shown that when a pixel is mixed between the green tide algae and the sea water (that is, when it is a mixed pixel), the spectral recognition ability of the pixel decreases, resulting in a small number of mixed pixels containing green tide being ignored and a large part of the mixed pixels containing green algae will be identified as pure green tide pixels, so that the monitored green tide coverage ratio will be much overestimated. Especially for remote sensing satellites with low and medium spatial resolutions, the green tide coverage ratio extracted based on mixed pixels has a large error.

The technical solutions of the present application and how the technical solutions of the present application solve the above technical problems are exemplified below with specific embodiments. It is noted that the specific embodiments listed below can be combined with each other, and the same or similar concepts or processes may not be repeated in some embodiments.

Figure 1:
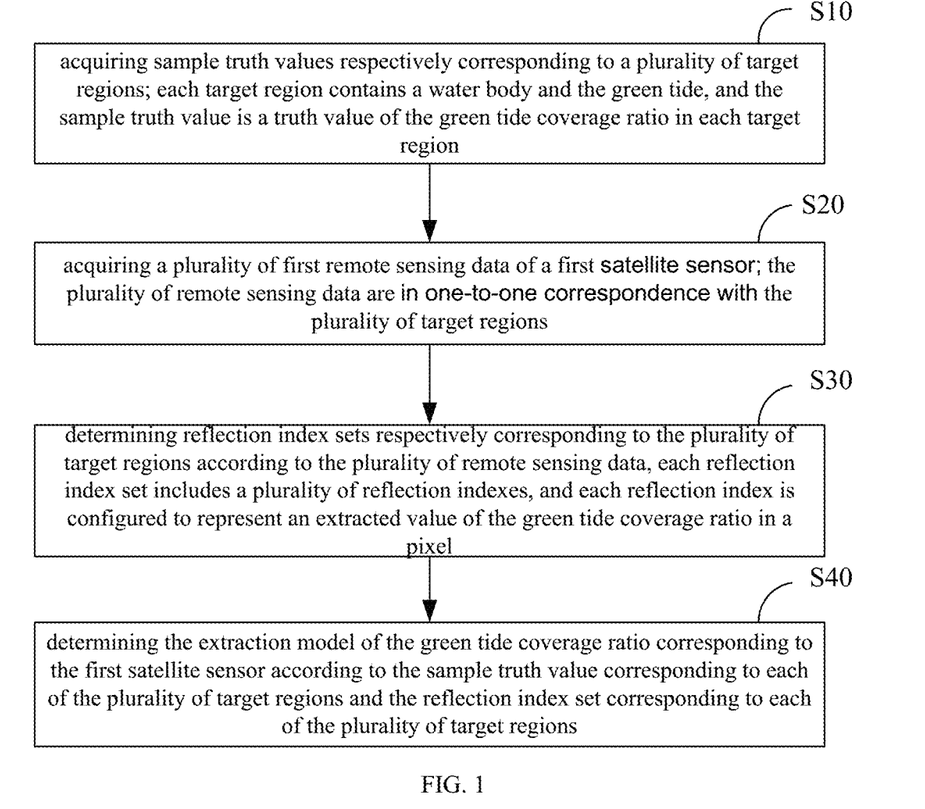
FIG. 1 is a schematic flowchart of a method for determining an extraction model of a green tide coverage ratio based on mixed pixels provided by an embodiment of the present application.

FIG. 1 is a schematic flowchart of a method for determining an extraction model of a green tide coverage ratio based on mixed pixels according to an embodiment of the present application. As shown in FIG. 1, the above-mentioned method for determining the extraction model of the green tide coverage ratio based on mixed pixels includes:

S10: acquiring sample truth values respectively corresponding to a plurality of target regions; each target region contains water body and green tide, and each sample truth value is a truth value of the green tide coverage ratio in each target region.

In the embodiment, the target region may refer to a region where green tides frequently erupt, such as the Yellow Sea region.

Among them, the green tide coverage ratio in the multiple target regions may be different, and the areas of the multiple target regions may be different.

In the embodiment, the sample truth values respectively corresponding to the plurality of target regions can be determined according to the measured spectral characteristics; the sample truth values respectively corresponding to the plurality of target regions can be acquired according to the satellite remote sensing data with high spatial resolution; and the sample truth values respectively corresponding to the plurality of target regions can be acquired by other methods, which are not limited here.

In an example, acquiring the sample truth values respectively corresponding to the plurality of target regions may refer to acquiring a spectral characteristic of each target region according to the detection of a spectral measurement device, and calculating to acquire a truth value of the green tide coverage ratio of each target region according to the acquired spectral characteristic.

Among them, the spectrum measurement device may refer to Analytica Spectra Devices (ASD).

In another example, acquiring the sample truth values respectively corresponding to the plurality of target regions may refer to acquiring remote sensing data of high spatial resolution satellites in the target regions to acquire spectral information of multiple pixels corresponding to the target regions; and determining a mixed pixels containing green tide in the multiple pixels according to the spectral information, so as to determine the truth value of the green tide coverage ratio of each target region according to the plurality of mixed pixels containing the green tide.

Among them, the spatial resolution can refer to a single ground feature or the smallest size between two adjacent ground features that can be recognized by the satellite sensor. The higher the spatial resolution, the more abundant ground feature information contained in the obtained remote sensing image, the smaller the target that can be identified.

Exemplarily, a satellite sensor with a high spatial resolution may refer to a satellite sensor with a spatial resolution less than or equal to 30 m.

S20: acquiring a plurality of first remote sensing data of a first satellite sensor; the plurality of remote sensing data are in one-to-one correspondence with the plurality of target regions.

In the embodiment, the first satellite sensor may be a geostationary satellite sensor used for ocean water color monitoring. For example, Geostationary Ocean Color Imager (GOCI) satellite sensor.

Among them, the spatial resolution of the GOCI satellite sensor is 500 m, which has a wide coverage and high time resolution, and can monitor the erupting of the green tide in a more timely manner.

Exemplarily, the band settings and related uses of the GOCI satellite sensor can be seen in Table 1.

TABLE 1

Band settings and related uses of the GOCI satellite sensor

| Band No. | central wavelength (nm) | band width (nm) | main function |
|---|---|---|---|
| 1 | 412 | 20 | Yellow substance and turbidity detection |
| 2 | 443 | 20 | Chlorophyll absorption peak detection |
| 3 | 490 | 20 | Chlorophyll and other pigment detection |
| 4 | 555 | 20 | Turbidity, suspended solids detection |
| 5 | 660 | 20 | Fluorescence signal baseline band, chlorophyll and suspended matter detection |
| 6 | 680 | 10 | Atmospheric correction and fluorescence signal |
| 7 | 745 | 20 | Atmospheric correction and baseline band of fluorescence signal |

TABLE 1-continued

Band settings and related uses of the GOCI satellite sensor

| Band No. | central wavelength (nm) | band width (nm) | main function |
|---|---|---|---|
| 8 | 865 | 40 | Aerosol optical thickness, vegetation, water vapor detection |

Among them, the GOCI satellite sensor has a total of 6 visible light bands and two near-infrared bands. Since the spectral reflectivity of the green tide and seawater are the biggest difference in the near-infrared band, in the embodiment, the first remote sensing data can refer to the remote sensing data of the near-infrared band, such as the 6th and 7th band remote sensing data.

S30: determining reflection index sets respectively corresponding to the plurality of target regions according to the plurality of remote sensing data, each reflection index set includes a plurality of reflection indexes, and each reflection index is configured to represent an extracted value of the green tide coverage ratio in a pixel.

In the embodiment, the reflectance index set corresponding to each target region may refer to a set of reflectance indices corresponding to each of the multiple pixels contained in the target region.

Among them, the multiple pixels contained in the target region may be determined by the spatial resolution of the first satellite sensor and the area of the target region.

For example, for a certain target region, the GOCI satellite sensor has a total of 143*178 pixels, and the reflection index corresponding to the target region may refer to the set of reflection indices corresponding to each of the 143*178 pixels.

In the embodiment, the reflection index includes a normalized difference vegetation index (NDVI).

Among them, the calculation formula of normalized vegetation index can refer to a formula (1)

$$NDVI_{(i,j)} = (\rho_{NIR(i,j)} - \rho_{RED(i,j)}) / (\rho_{NIR(i,j)} + \rho_{RED(i,j)}) \quad (1)$$

Among them, $NDVI_{(i,j)}$ represents to the normalized vegetation index of the pixel at the (i, j) position in the first satellite sensor, and $\rho_{NIR(i,j)}$ represents the reflectivity value of the pixel in the near-infrared band at the (i, j) position in the first satellite sensor, $\rho_{RED(i,j)}$ represents the reflectivity value of the pixel in the red light band at the (i, j) position of the first satellite sensor.

In the embodiment, the type of pixel may be a pure water pixel or mixed pixels, where the mixed pixels may refer to pixel that contains both green tide algae and sea water, and a pure water pixel may refer to a pixel that contains only sea water.

S40: determining the extraction model of the green tide coverage ratio corresponding to the first satellite sensor according to the sample truth value corresponding to each of the plurality of target regions and the reflection index set corresponding to each of the plurality of target regions.

In the embodiment, performing a fitting according to the green tide coverage ratio of all the pixels contained in the multiple target regions and the reflection index of all the pixels to generate a correlation relationship between the green tide coverage ratio and the reflection index. Therefore, the extraction model of the green tide coverage ratio corresponding to the first satellite sensor is determined according to the above-mentioned correlation relationship.

Among them, the green tide coverage ratio of each pixel can be determined according to the sample truth value corresponding to the target region to which it belongs.

For example, the sample truth value of each target region may be subjected to a resampling process with reduced resolution, so as to determine the respective green tide coverage ratios of the multiple pixels contained in each target region.

In the embodiment, the input of the extraction model of the green tide coverage ratio corresponding to the first satellite sensor is the reflection index of any pixel determined based on the first satellite sensor, and the output is the green tide coverage ratio of the pixel.

In the embodiment, after the extraction model of the green tide coverage ratio is acquired, the green tide coverage ratio of multiple pixels in the region to be tested can be acquired according to the extraction model of the green tide coverage ratio, and then according to the green tide coverage ratio of the multiple pixels to determine the green tide coverage ratio of the region to be tested.

In the method for determining an extraction model of a green tide coverage ratio based on mixed pixels provided by embodiments of the present application, the extraction model of the green tide coverage ratio corresponding to the first satellite sensor is determined according to the sample truth values respectively corresponding to the plurality of target regions and the reflection index sets respectively corresponding to the plurality of target regions. Since the sample truth value is the truth value of the green tide coverage ratio of each target region, such that the extracted value of the green tide coverage ratio obtained based on the first satellite sensor can be corrected based on the extraction model of the green tide coverage ratio. Thereby the coverage ratio of multiple green tides in the region to be detected can be determined. The extraction model of the green tide coverage ratio is used to correct the extracted value of the green tide coverage ratio extracted based on the remote sensing data of the satellites with low and medium resolution in the prior art, which greatly reduces the error of the remote sensing detection of the green tide coverage ratio of the satellites with low and medium resolution. In this way, the green tide coverage ratio in the region to be tested can be directly estimated based on the remote sensing detection data of the satellites with low and medium resolution.

In practical applications, if the target region is a large ocean region, it is more difficult to acquire the spectral characteristics of the target region based on the detection of the spectral measurement device. Therefore, it is usually necessary to determine the true coverage region of the green tide of the target and the truth value of the green tide coverage ratio based on the remote sensing data of the high spatial resolution satellite in the target region. An exemplary description will be given below through the embodiments of FIG. 2 and FIG. 3.

Figure 2:
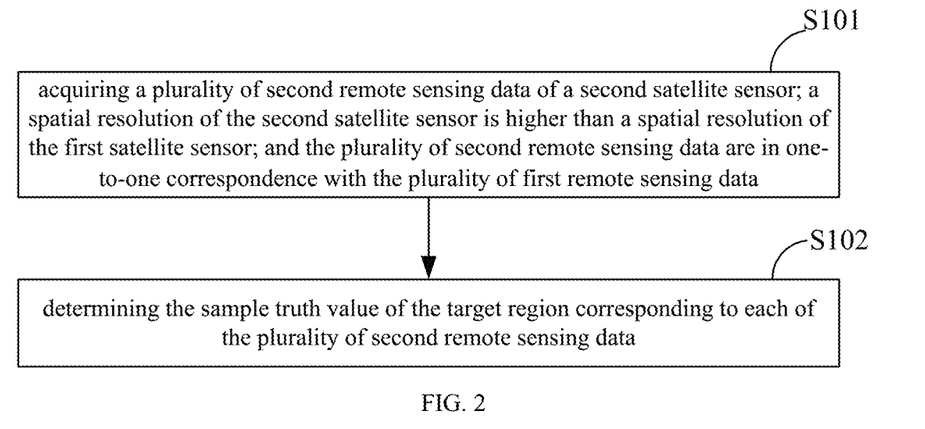
FIG. 2 is a schematic flowchart of determining sample truth value of target region provided by an embodiment of the present application.

FIG. 2 is a schematic flowchart of the sample truth value of a target region according to an embodiment of the present application. The embodiment in FIG. 2 describes a possible implementation of step S10 in the embodiment in FIG. 1. As shown in FIG. 2, acquiring the sample truth value corresponding to each of the plurality of target regions includes:

S101: acquiring a plurality of second remote sensing data of a second satellite sensor; a spatial resolution of the second satellite sensor is higher than a spatial resolution of the first satellite sensor; and the plurality of second remote sensing data are in one-to-one correspondence with the plurality of first remote sensing data.

Due that the spatial resolution is an important factor affecting the accuracy of the extraction area of the green tide, the higher the spatial resolution, the higher the accuracy of the extracted value of the green tide coverage ratio. Based on this, in the embodiment, the spatial resolution of the second satellite sensor is higher than the spatial resolution of the first satellite sensor.

Among them, the higher the spatial resolution of the second satellite sensor, the higher the reliability of the sample truth value of acquired based on the second satellite sensor.

For example, the second satellite sensor may be a satellite sensor with a high spatial resolution with a spatial resolution of less than or equal to 30 m, such as the Landsat-8 satellite. The spatial resolution of the Landsat-8 is 30 m.

In the embodiment, the second remote sensing data may be based on remote sensing data collected when the second satellite sensor is located over the target region. The second remote sensing data may include remote sensing data in the near-infrared band.

S102: determining the sample truth value of the target region corresponding to each of the plurality of second remote sensing data.

In the process of receiving the second remote sensing data corresponding to the target region by the second satellite sensor, the electromagnetic radiation radiated from the target region passes through the atmosphere. Due to the presence of various gases and aerosols in the atmosphere, the radiation energy of the target region is reduced due to atmospheric attenuation. At the same time, external factors such as the sun and satellites can also produce interference signals. Therefore, it is possible to perform atmospheric correction processing on the satellite remote sensing image received by the satellite sensor in order to remove the interference signal and extract the effective radiation information of the target region.

In the embodiment, before determining the sample truth value of the target region corresponding to each second remote sensing data, the second remote sensing data may be preprocessed first, and the preprocessing may refer to atmospheric correction processing.

Among them, the method for the atmospheric correction may include a rapid atmospheric correction method and a dark pixel method, which are not specifically limited here.

In the embodiment, determining the sample truth value of the target region corresponding to each second remote sensing data may refer to first acquiring the extracted value of the green tide coverage ratio of the multiple pixels contained in the target region according to the second remote sensing data, performing the correction of the extracted value by containing the target region image to determine the green tide coverage ratio of the multiple pixels contained in the target region, and determine the sample truth value of the target region according to the green tide coverage ratio of the multiple pixels contained in the target region. The following is an exemplary description through the embodiment of FIG. 3.

Figure 3:
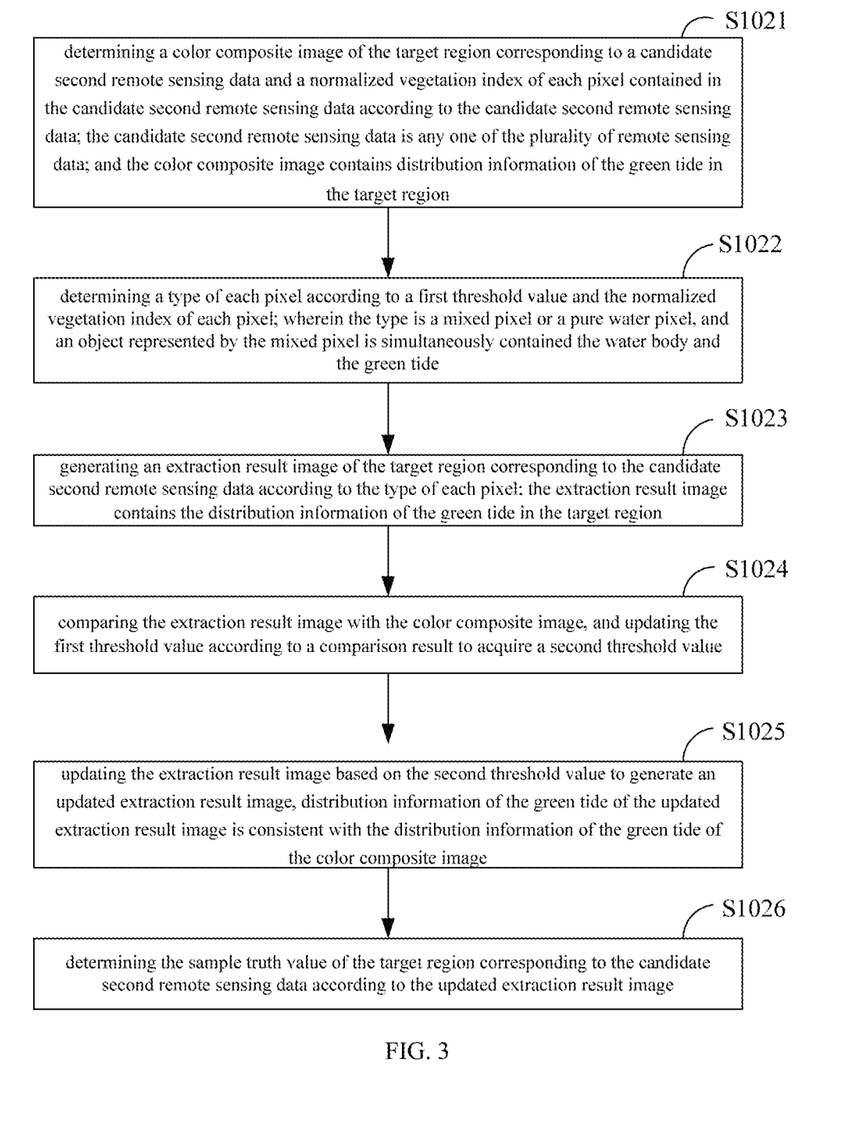
FIG. 3 is a schematic flowchart of determining sample truth value of target region provided by another embodiment of the present application.

FIG. 3 is a schematic flow chart of determining the sample truth value of a target region according to another embodiment of the present application. The embodiment in FIG. 3 describes a possible implementation of step S102 in the embodiment in FIG. 2. As shown in FIG. 3, determining the sample truth value of the target region corresponding to each of the plurality of second remote sensing data includes:

S1021: determining a color composite image of the target region corresponding to a candidate second remote sensing data and a normalized vegetation index of each pixel contained in the candidate second remote sensing data according to the candidate second remote sensing data; the candidate second remote sensing data is any one of the plurality of remote sensing data; and the color composite image contains distribution information of the green tide in the target region.

In the embodiment, the color composite image contains the green tide distribution information of the target region.

The color composite image may refer to an RGB color image, and the above-mentioned RGB color image may be acquired by compositing remote sensing images in the red, green, and blue bands of the second satellite sensor.

Among them, the RGB color image contains the green tide distribution information of the target region, for example, the location and area of the green tide in the target region, and the location and area of the sea water.

In the embodiment, the spatial resolution of the second satellite sensor is higher than the spatial resolution of the first satellite sensor. Therefore, for a certain target region, the number of pixels contained in the second remote sensing data corresponding to the target region is greater than the number of pixels contained in the first remote sensing data corresponding to the target region.

For example, if the first satellite sensor is a GOCI satellite sensor with a spatial resolution of 500 m, and the second satellite sensor is a Landsat-8 satellite sensor with a spatial resolution of 30 m, the spatial resolution of the second satellite sensor is about 1717 times to that of the first satellite sensor.

Correspondingly, in the target region, the GOCI satellite sensor has m*n pixels, and the corresponding Landsat-8 satellite sensor has about 17m*17n pixels in the target region.

Exemplarily, for a certain target region, the GOCI satellite sensor has a total of 143178 pixels, and the corresponding Landsat 8 contains 2368*2963 pixels. Correspondingly, determining the normalized vegetation index of each pixel contained in the candidate second remote sensing data may refer to determining the normalized vegetation index of 2368*2963 pixels contained in the second remote sensing data corresponding to the target region.

Among them, the implementation manner of determining the normalized vegetation index of each pixel is the same as the implementation manner of determining the respective reflection indices of multiple pixels contained in the target region in the embodiment of FIG. 1, which will not be repeated here.

S1022: determining a type of each pixel according to a first threshold value and the normalized vegetation index of each pixel; wherein the type is mixed pixels or a pure water pixel, and an object represented by the mixed pixels simultaneously contains the water body and the green tide.

In the embodiment, the first threshold is an adjustable preset value.

In the embodiment, determining the type of each pixel according to the first threshold and the normalized vegetation index of each pixel may refer to, for each pixel, judging whether the normalized vegetation index of the pixel is greater than or equal to the first threshold. If the normalized vegetation index of the pixel is greater than or equal to the first threshold, the pixel is determined to be a mixed pixel; if the normalized vegetation index of the pixel is less than the first threshold, the pixel is determined to be pure water pixel.

S1023: generating an extraction result image of the target region corresponding to the candidate second remote sensing data according to the type of each pixel; the extraction result image contains the distribution information of the green tide in the target region.

In the embodiment, the extraction result image may refer to an image containing green tide distribution information and/or sea water distribution information of the target region.

Among them, the green tide and sea water region in the extraction result image can be distinguished by the boundary line.

In the embodiment, generating the extraction result image of the target region corresponding to the candidate second remote sensing data according to the type of each pixel, which can be a pointer to the second remote sensing data containing each pixel, and the type of the pixel being the object represented by the pixel of the mixed pixels is marked as green tide, and the type of the pixel being the object represented by the pixel of the pure water pixel is marked as pure water, and then the extraction result image of the target region is generated.

S1024: comparing the extraction result image with the color composite image, and updating the first threshold value according to a comparison result to acquire a second threshold value.

In the embodiment, comparing the extraction result image with the color composite image may refer to comparing the extraction result image with the color composite image based on a visual interpretation manner to judge the matching degree of the green tide distribution information in the extraction result image with the green tide distribution information in the color composite image, When the matching degree of the green tide distribution information does not meet the preset requirement, the first threshold is updated to acquire the second threshold.

Where the matching degree does not meet the preset requirement, it may mean that the ratio of the area of the green tide in the extraction result image to the area of the green tide of the color composite image is greater than the first preset value, or the ratio of the area of the green tide in the extraction result image to the area of the green tide of the color composite image is less than the second preset value, wherein the second preset value is less than the first preset value.

Among then, updating the first threshold value to acquire a second threshold value may refer to increasing the first threshold when the ratio of the area of the green tide in the extraction result image to the area of the green tide of the color composite image is greater than the first preset value, to acquire the second threshold value until the matching degree between the area of the green tide in the color composite image and the area of the green tide in the extraction result image updated according to the second threshold value meets the preset requirement.

Correspondingly, when the ratio of the area of the green tide in the extraction result image to the area of the green tide of the color composite image is less than the first preset value, the first threshold value is reduced to acquire the second threshold value, until the matching degree between the area of the green tide in the color composite image and the area of the green tide in the extraction result image updated according to the second threshold value meets the preset requirement.

S1025: updating the extraction result image based on the second threshold value to generate an updated extraction result image, distribution information of the green tide of the updated extraction result image is consistent with the distribution information of the green tide of the color composite image.

In the embodiment, the area information of the green tide of the updated extraction result image is consistent with the distribution information of the green tide of the color composite image, which may mean that the matching degree of the distribution information of the green tide of the updated extraction result image with the distribution information of the green tide of the color composite image is greater than the second preset threshold value and less than the first preset threshold value.

S1026: determining the sample truth value of the target region corresponding to the candidate second remote sensing data according to the updated extraction result image.

In the embodiment, the corresponding sample truth value can be determined according to the distribution information of the green tide of the target region in the updated extraction result image.

In the embodiment, determining the sample truth value of the target region according to the updated extraction result image, which may mean identifying the green tide pixel contained in the second satellite sensor according to the updated extraction result image, and calculating a ratio of the green tide pixel in all the above-mentioned pixels, and determining the ratio as the truth value of the green tide coverage ratio of the second satellite sensor in the target region, that is, the sample truth value of the target region.

Among them, the green tide pixel represents the object represented by the pixel is green tide. Identifying the green tide pixel contained in the second satellite sensor may refer to calculating the normalized vegetation index of each pixel contained in the target region by the second satellite sensor, and the pixel with normalized vegetation index being greater than the third preset threshold value is determined to be the green tide pixel.

Figure 4:
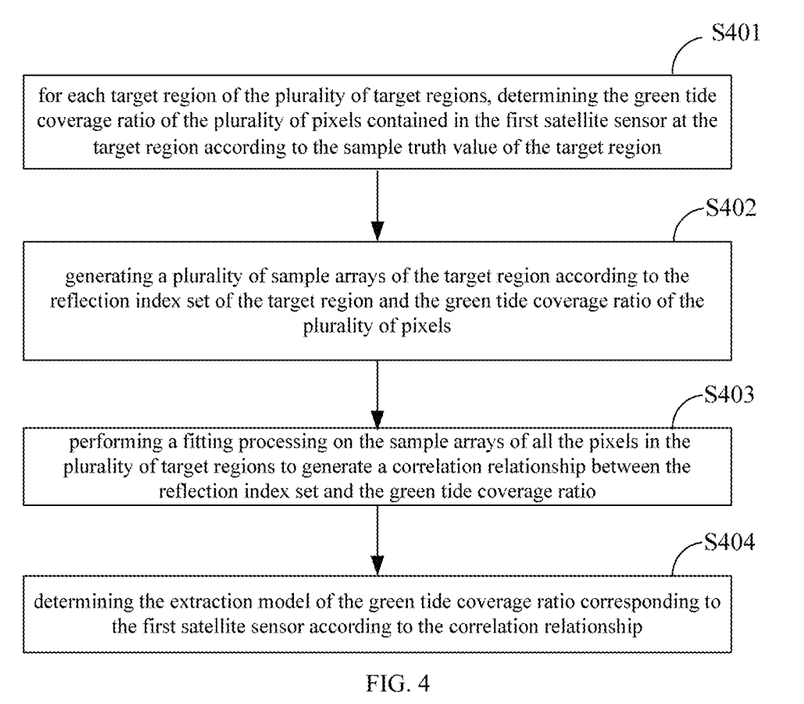
FIG. 4 is a schematic flowchart of determining an extraction model of a green tide coverage ratio provided by an embodiment of the present application.

FIG. 4 is a schematic flow chart of determining the extraction model of the green tide coverage ratio provided by an embodiment of the present application, and describes a possible implementation of step S40 in the embodiment of FIG. 1. As shown in FIG. 4, determining the extraction model of the green tide coverage ratio corresponding to the first satellite sensor includes:

S401: for each target region of the plurality of target regions, determining the green tide coverage ratio of the plurality of pixels contained in the first satellite sensor at the target region according to the sample truth value of the target region.

In the embodiment, the sample truth value of the target region may be the sample truth value determined according to the second remote sensing data of the second satellite sensor.

It can be seen from the embodiment in FIG. 3 that before determining the sample truth value of the target region, all the pixels contained in the target region of the second satellite sensor can be divided into mixed pixels and pure water pixels.

Then determine the green tide coverage ratio of all the pixels in the target region by the first satellite sensor according to the type of the second satellite sensor containing all the pixels in the target region.

Among them, the number of pixels contained in the target region by the second satellite sensor is greater than the number of pixels contained in the target region by the first satellite sensor. All the pixels contained in the target region of the second satellite sensor can be matrix-divided according to the ratio of the spatial resolution of the second satellite sensor and the first satellite sensor, to acquire small matrices being in one-to-one correspondence to the pixels contained in the target region by the first satellite sensor, and then the green tide coverage ratio of each small matrix is determined, and the green tide coverage ratio of each small matrix is determine as the green tide coverage ratio of the first satellite sensor pixel corresponding to the small matrix.

For example, for a certain target region, the first satellite sensor is the GOCI satellite sensor. The GOCI satellite sensor contains a total of 143178 pixels, and the corresponding Landsat 8 contains 2368*2963 pixels, and the Landsat 8 containing 2368*2963 pixels are divided into small matrices of 1717 (or 1617), so that the total number of small matrices is 143×178, and then the green tide coverage ratio of each small matrix is determined. The green tide coverage ratio is determined as the green tide coverage ratio of the first satellite sensor pixel corresponding to the small matrix.

Exemplarily, one pixel of the GOCI satellite sensor corresponds to 1717=289 pixels of the Landsat 8. If the object represented by 100 pixels of the 289 pixels are green tides, then the green tide coverage ratio of the GOCI pixel is 100/289=34.6%.

S402: generating a plurality of sample arrays of the target region according to the reflection index set of the target region and the green tide coverage ratio of the plurality of pixels.

Among them, each sample data includes the reflection index of a pixel and the green tide coverage ratio of the pixel.

For example, for a target region, the GOCI satellite sensor has a total of 143*178 pixels, and each pixel corresponds to a reflection index and a green tide coverage ratio, and 143*178 sample arrays can be obtained.

S403: performing a fitting processing on the sample arrays of all the pixels in the plurality of target regions to generate a correlation relationship between the reflection index set and the green tide coverage ratio.

In the embodiment, multiple pixels may refer to all pixels in multiple target regions. Wherein, the pixel of each target region can be determined according to the number of pixels of the first satellite sensor in the target region.

In the embodiment, the correlation relationship between the reflection index and the green tide coverage ratio can be characterized as a linear function.

The fitting processing in the embodiment may refer to the least squares fitting method.

Figure 5:
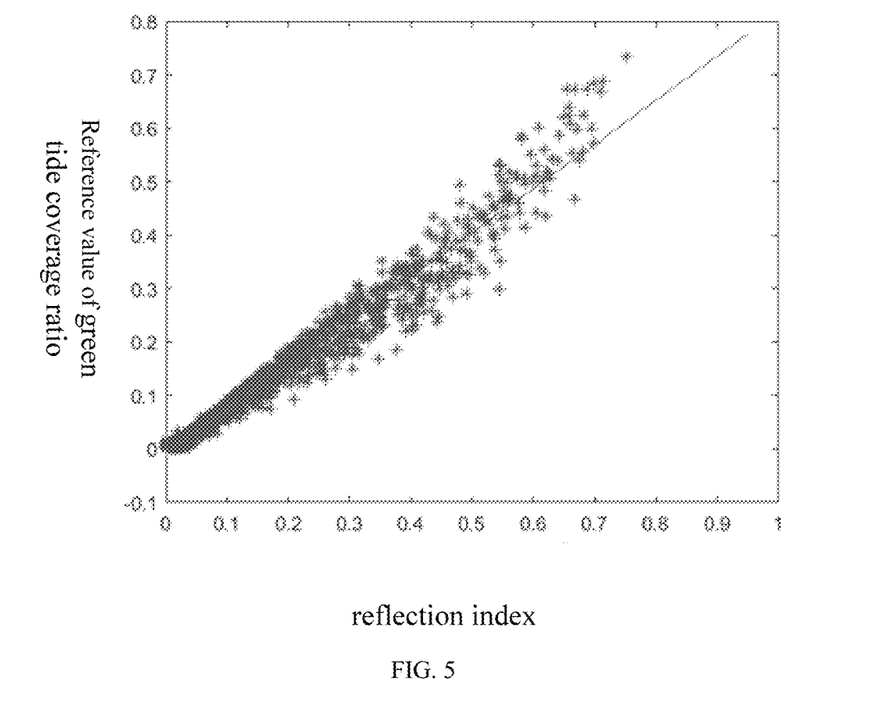
FIG. 5 is a schematic diagram of a correlation relationship between a reflection index and a green tide coverage ratio provided by an embodiment of the present application.

Exemplarily, please refer to FIG. 5 together. FIG. 5 is a schematic diagram of the correlation relationship between the reflection index and the green tide coverage ratio provided by an embodiment of the present application. As shown in FIG. 5, the correlation relationship between the reflection index and the green tide coverage ratio is a linear relationship, which can be expressed as formula (2);

$$S=0.9586*x-0.04561 \quad (2)$$

Among them, S represents the green tide coverage ratio of the pixel, and x represents the reflection index of the pixel. In the example, x can represent the normalized vegetation index of the pixel.

S404: determining the extraction model of the green tide coverage ratio corresponding to the first satellite sensor according to the correlation relationship.

In the embodiment, after the correlation relationship between the reflection index and the green tide coverage ratio is generated, the extraction model of the green tide coverage ratio corresponding to the first satellite sensor is determined according to the correlation relationship, and the input of the extraction model of the green tide coverage ratio is the normalized vegetation index of the pixel, and is output as the green tide coverage ratio of the pixel.

In the embodiment, after the extraction model of the green tide coverage ratio is obtained, the green tide coverage ratio of multiple pixels in the region to be tested can be obtained according to the extraction model of the green tide coverage ratio, and then according to the green tide coverage ratio of the multiple pixels to determine the green tide coverage ratio of the region to be tested.

In the embodiment, the green tide coverage ratio extracted based on the remote sensing data of the low and medium resolution satellites in the prior art is corrected by the extraction model of the green tide coverage ratio, which greatly reduces the green tide coverage of the remote sensing detection by the low and medium resolution satellites. Therefore, the truth value of the green tide coverage ratio in the mixed pixels can be directly estimated and obtained according to the remote sensing detection data of the low and medium resolution satellites.

Figure 6:
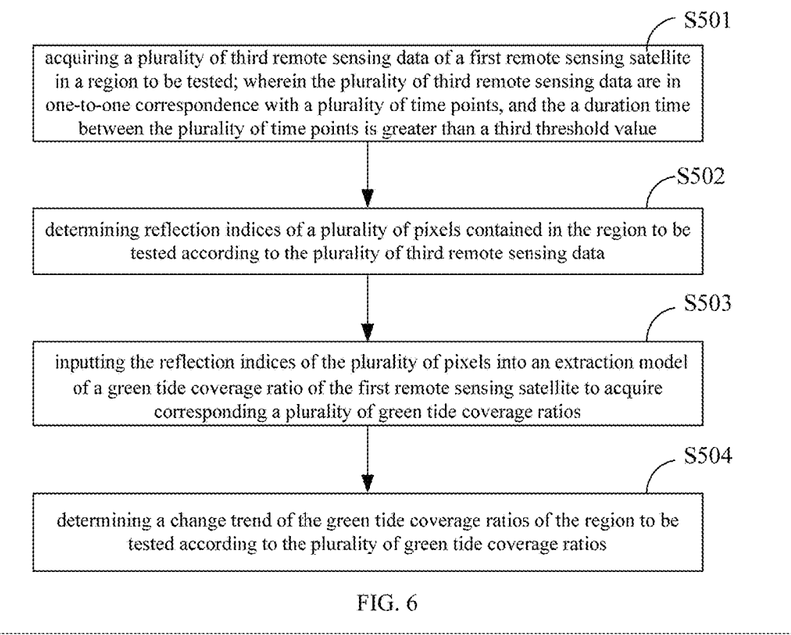
FIG. 6 is a schematic flowchart of a method for determining a green tide coverage ratio provided by an embodiment of the present application.

FIG. 6 is a schematic flowchart of a method for determining a green tide coverage ratio provided by an embodiment of the present application. As shown in FIG. 6, the above-mentioned method for determining a green tide coverage ratio includes:

S501: acquiring a plurality of third remote sensing data of a first remote sensing satellite in a region to be tested; wherein the plurality of third remote sensing data are in one-to-one correspondence with a plurality of time points, and the a duration time between the plurality of time points is greater than a third threshold value.

In the embodiment, the region to be tested may be another region located in the same sea region as the target region in the embodiment of FIG. 1.

In the embodiment, the first remote sensing satellite is the same as the first remote sensing satellite in the embodiment of FIG. 1, for example, both are GOCI satellite sensors.

In the embodiment, acquiring multiple third remote sensing data of the first remote sensing satellite in the region to be tested may refer to multiple third remote sensing data acquired when the first remote sensing satellite passes over the region to be tested at different time points.

Among them, the third remote sensing data may refer to the remote sensing data in the near-infrared band.

In the embodiment, that the duration time between multiple time points is greater than the third threshold value may mean that the duration time between the latest time and the earliest time in the multiple time points is greater than the third threshold value.

S502: determining reflection indices of a plurality of pixels contained in the region to be tested according to the plurality of third remote sensing data.

In the embodiment, the method for determining the reflectance indices of the multiple pixels contained in the region to be tested according to the third remote sensing data is the same as the method for determining reflection indices respectively corresponding to multiple pixels contained in the target region according to the first remote sensing data in the embodiment in FIG. 1, which is not repeated here.

S503: inputting the reflection indices of the plurality of pixels into an extraction model of a green tide coverage ratio of the first remote sensing satellite to acquire corresponding a plurality of green tide coverage ratios.

In the embodiment, the extraction model of the green tide coverage ratio of the first remote sensing satellite may be the extraction model of the green tide coverage ratio determined by the method in any of the embodiments shown in FIGS. 1 to 4.

In the embodiment, after each reflection index is input into the extraction model of the green tide coverage ratio of the first remote sensing satellite, a corresponding green tide coverage ratio is obtained.

Multiple green tide coverage ratios represent the green tide coverage ratios of the region to be tested at different time points.

S504: determining a change trend of the green tide coverage ratios of the region to be tested according to the plurality of green tide coverage ratios.

In the embodiment, the change trend of the green tide coverage ratio of the region to be tested can be represented by a change curve of the green tide coverage ratio.

Among them, determining the change trend of the green tide coverage ratio of the region to be tested may refer to sorting in the order of morning and evening at multiple time points, and connecting the green tide coverage ratios corresponding to two adjacent time points to acquire the change curve of the green tide coverage ratio of the region to be tested at multiple time points.

The extraction model of the green tide coverage ratio in the method for determining the green tide coverage ratio provided by the embodiments of the present application is the extraction model of the green tide coverage ratio in the embodiments of FIGS. 1 to 4, and the green tide coverage ratio of the region to be predicted at multiple time points is determined according to the extraction model of the green tide coverage ratio, and then the change trend of the green tide coverage ratio in the long time series of the region to be predicted is obtained, so as to deal with the green tide in the region to be predicted in time according to the trend, and prevent the erupting of the large green tide in the region to be predicted.

It should be understood that the size of the sequence number of each step in the foregoing embodiment does not mean the sequence of execution. The execution sequence of each process should be determined by its function and internal logic, and should not constitute any limitation on the implementation process of the embodiment of the present application.

Based on the method for determining the extraction model of the green tide coverage ratio based on the mixed pixels provided in the foregoing embodiment, the embodiment of the present invention further provides an embodiment of a device for realizing the foregoing method embodiment.

Figure 7:
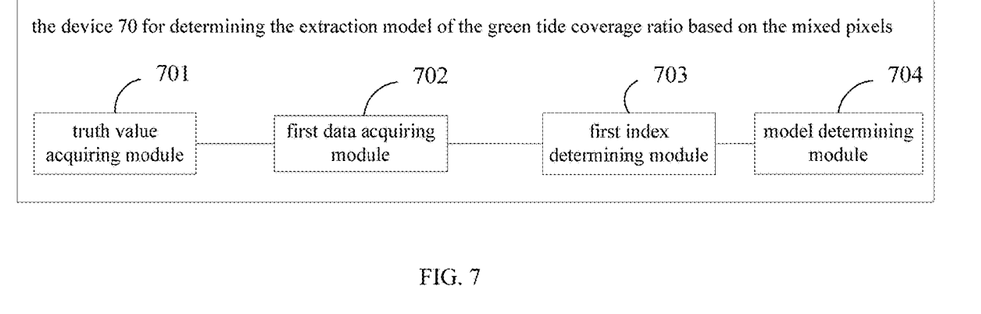
FIG. 7 is a structural schematic diagram of a device for determining an extraction model of a green tide coverage ratio based on mixed pixels provided by an embodiment of the present application.

FIG. 7 is a structural schematic diagram of a device for determining an extraction model of the green tide coverage ratio based on mixed pixels according to an embodiment of the present application. As shown in FIG. 7, the device 70 for determining the extraction model of the green tide coverage ratio based on the mixed pixels includes: a truth value acquiring module 701, a first data acquiring module 702, a first index determining module 703, and a model determining module 704.

The truth value acquiring module 701 is configured for acquiring sample truth values respectively corresponding to a plurality of target regions; wherein each target region contains water body and green tide, and each sample truth value is a truth value of the green tide coverage ratio in each target region;

The first data acquisition module 702 is configured for acquiring a plurality of first remote sensing data of a first satellite sensor; wherein the plurality of remote sensing data are in one-to-one correspondence with the plurality of target regions;

The first index determination module 703 is configured for determining reflection index sets respectively corresponding to the plurality of target regions according to the plurality of remote sensing data, wherein each reflection index set comprises a plurality of reflection indexes, and each reflection index is configured to represent an extracted value of the green tide coverage ratio in a pixel; and The model determination module 704 is configured for determining the extraction model of the green tide coverage ratio corresponding to the first satellite sensor according to the sample truth value corresponding to each of the plurality of target regions and the reflection index set corresponding to each of the plurality of target regions.

Optionally, the truth value acquisition module 701 acquires the sample truth value corresponding to each of the multiple target regions, which may specifically include: acquiring a plurality of second remote sensing data of a second satellite sensor; wherein a spatial resolution of the second satellite sensor is higher than a spatial resolution of the first satellite sensor; and the plurality of second remote sensing data are in one-to-one correspondence with the plurality of first remote sensing data; and determining the sample truth value of the target region corresponding to each of the plurality of second remote sensing data.

Optionally, the truth value obtaining module 701 determines the sample truth value of the target region corresponding to each of the second remote sensing data, which may specifically include:

determining a color composite image of the target region corresponding to a candidate second remote sensing data and a normalized vegetation index of each pixel contained in the candidate second remote sensing data according to the candidate second remote sensing data; the candidate second remote sensing data is any one of the plurality of remote sensing data; and the color composite image contains distribution information of the green tide in the target region;

determining a type of each pixel according to a first threshold value and the normalized vegetation index of each pixel; wherein the type is mixed pixels or a pure water pixel, and an object represented by the mixed pixels simultaneously contains the water body and the green tide;

generating an extraction result image of the target region corresponding to the candidate second remote sensing data according to the type of each pixel; the extraction result image contains the distribution information of the green tide in the target region;

comparing the extraction result image with the color composite image, and updating the first threshold value according to a comparison result to acquire a second threshold value;

updating the extraction result image based on the second threshold value to generate an updated extraction result image, distribution information of the green tide of the updated extraction result image is consistent with the distribution information of the green tide of the color composite image; and determining the sample truth value of the target region corresponding to the candidate second remote sensing data according to the updated extraction result image.

Optionally, the model determining module 704 determines the extraction model of the green tide coverage ratio corresponding to the first satellite sensor according to the sample truth value corresponding to each of the multiple target regions and the reflection index corresponding to each of the multiple target regions, which may specifically include:

for each target region of the plurality of target regions, determining the green tide coverage ratio of the plurality of pixels contained in the first satellite sensor at the target region according to the sample truth value of the target region;

generating a plurality of sample arrays of the target region according to the reflection index set of the target region and the green tide coverage ratio of the plurality of pixels;

performing a fitting processing on the sample arrays of all the pixels in the plurality of target regions to generate a correlation relationship between the reflection index set and the green tide coverage ratio; and determining the extraction model of the green tide coverage ratio corresponding to the first satellite sensor according to the correlation relationship.

Optionally, the reflection index includes a normalized vegetation index.

The device for determining the extraction model of the green tide coverage ratio based on the mixed pixels provided in the embodiment shown in FIG. 7 can be used to implement the technical solutions in the method embodiments of FIGS. 1 to 4, and the implementation principles and technical effects are similar. The embodiment will not be repeated here.

Figure 8:
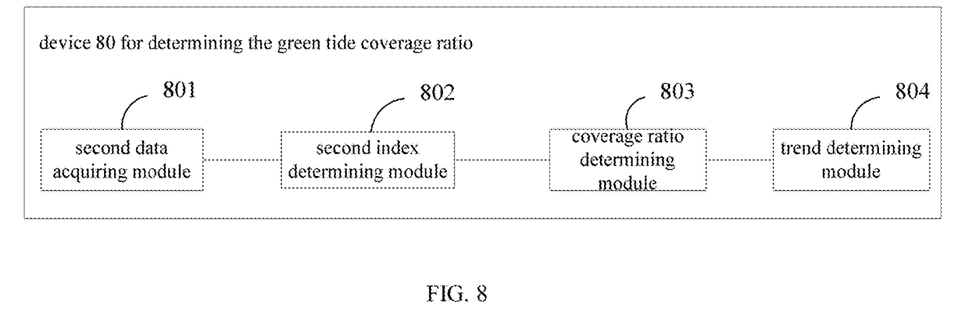
FIG. 8 is a structural schematic diagram of a device for determining a green tide coverage ratio provided by an embodiment of the present application.

FIG. 8 is a structural schematic diagram of a device for determining a green tide coverage ratio provided by an embodiment of the present application. As shown in FIG. 8, the device 80 for determining the green tide coverage ratio includes: a second data acquiring module 801, a second index determining module 802, a coverage ratio determining module 803, and a trend determining module 804; among them:

the second data acquiring module 801 is configured for acquiring a plurality of third remote sensing data of a first remote sensing satellite in a region to be tested; wherein the plurality of third remote sensing data are in one-to-one correspondence with a plurality of time points, and the a duration time between the plurality of time points is greater than a third threshold value;

the second index determining module 802 is configured for determining reflection indices of a plurality of pixels contained in the region to be tested according to the plurality of third remote sensing data;

the coverage ratio determining module 803 is configured for inputting the reflection indices of the plurality of pixels into an extraction model of a green tide coverage ratio of the first remote sensing satellite to acquire corresponding a plurality of green tide coverage ratios; the extraction model of the green tide coverage ratio is the model determined based on the device of FIG. 7; and the trend determining module 804 is configured for determining a change trend of the green tide coverage ratios of the region to be tested according to the plurality of green tide coverage ratios.

The device for determining the green tide coverage ratio provided in the embodiment shown in FIG. 8 can be used to implement the technical solution in the method embodiment of FIG. 6 above, and its implementation principles and technical effects are similar, and the embodiment will not be repeated here.

Figure 9:
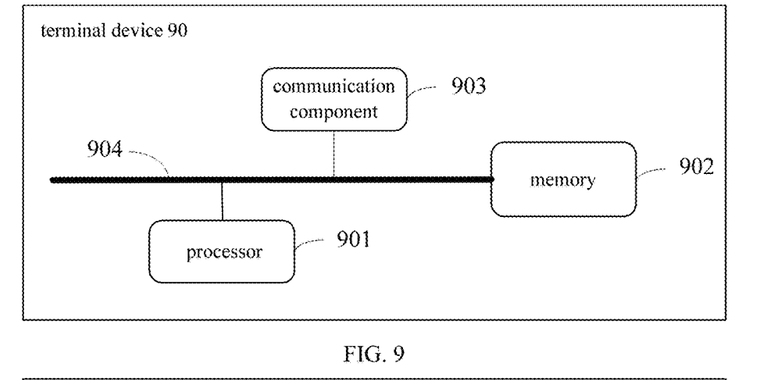
FIG. 9 is a schematic diagram of a terminal device provided by an embodiment of the present application.

FIG. 9 is a schematic diagram of a terminal device provided by an embodiment of the present application. As shown in FIG. 9, the terminal device 90 of the embodiment includes: at least one first processor 901, a first memory 902, and a computer program stored in the first memory 902 and can run on the first processor 901. The terminal device further includes a first communication component 903, wherein the first processor 901, the first memory 902, and the first communication component 903 are connected by a first bus 904.

When the first processor 901 executes the computer program, the steps in the above embodiments of the method for determining the extraction model of the green tide coverage ratio based on mixed pixels are implemented, for example, steps S10 to S40 in the embodiment shown in FIG. 1. Alternatively, when the first processor 901 executes the computer program, the functions of the modules/units in the above-mentioned device for determining the extraction model of the green tide coverage ratio based on mixed pixels are implemented, for example, the functions of the modules 701 to 704 shown in FIG. 7.

Figure 10:
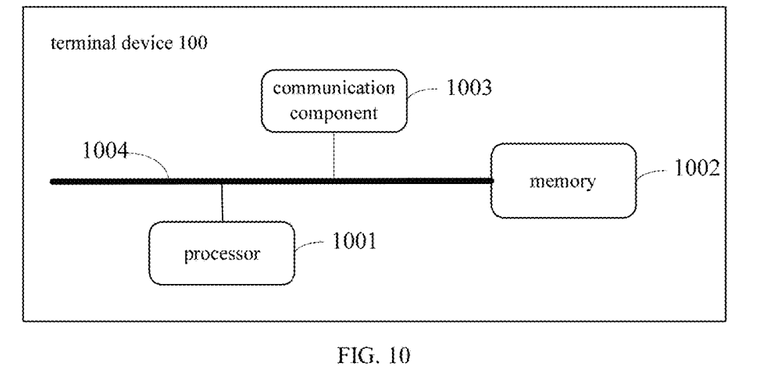
FIG. 10 is a schematic diagram of a terminal device provided by another embodiment of the present application.

FIG. 10 is a schematic diagram of a terminal device provided by another embodiment of the present application. As shown in FIG. 10, the terminal device 100 of the embodiment includes: at least one second processor 1001, a second memory 902, and a computer program stored in the second memory 1002 and can run on the second processor 1001. The terminal device further includes a second communication component 1003, wherein the second processor 1001, the second memory 1002, and the second communication component 1003 are connected by a second bus 1004.

When the second processor 1001 executes the computer program, the steps in the above embodiments of the method for determining the green tide coverage ratio are implemented, for example, step S501 to step S504 in the embodiment shown in FIG. 6. Alternatively, the second processor 1001 implements the functions of the modules/units in the embodiment of the device for determining the green tide coverage ratio when executing the computer program, such as the functions of the modules 801 to 804 shown in FIG. 8.

Those skilled in the art can understand that FIGS. 9 and 10 are only examples of terminal devices and do not constitute a limitation on the terminal devices. They may include more or less components than those shown in the figure, or combine certain components, or different components, such as input and output devices, network access devices, buses, etc.

The so-called first processor 901 or second processor 1001 may be a central processing unit (CPU), or may be other general-purpose processors, digital signal processors (DSP), and application specific integrated circuits (ASIC), Field-Programmable Gate Array (FPGA) or other programmable logic devices, discrete gates or transistor logic devices, discrete hardware components, etc. The general-purpose processor may be a microprocessor or the processor may also be any conventional processor or the like.

The first memory 902 or the second memory 1002 may be an internal storage unit of the terminal device, or may be an external storage device of the terminal device.

The bus may be an industry standard architecture (ISA) bus, a peripheral component interconnection (PCI) bus, or an extended industry standard architecture (EISA) bus, etc. For ease of representation, the buses in the drawings of the present application are not limited to only one bus or one type of bus.

The embodiments of the present application also provide a computer-readable storage medium, wherein the computer-readable storage medium stores a computer program, and when the computer program is executed by a processor, the steps in the foregoing method embodiments can be realized.

The embodiments of the present application provide a computer program product. When the computer program product runs on a mobile terminal, the steps in the foregoing method embodiments can be realized when the mobile terminal is executed.

If the integrated unit is implemented in the form of a software functional unit and sold or used as an independent product, it can be stored in a computer readable storage medium. Based on this understanding, the present application implements all or part of the processes in the above-mentioned methods, which can be completed by instructing relevant hardware through a computer program, the computer program can be stored in a computer-readable storage medium, and when the computer program is executed by the processor, the steps of the foregoing method embodiments can be implemented. Among them, the computer program includes computer program code, and the computer program code may be in the form of source code, object code, executable file, or some intermediate forms. The computer-readable medium may include at least: any entity or device capable of carrying the computer program code to the photographing device/terminal device, recording medium, computer memory, read-only memory (ROM), random access memory (RAM) etc.

In the above-mentioned embodiments, the description of each embodiment has its own emphasis. For parts that are not described in detail or recorded in an embodiment, reference may be made to related descriptions of other embodiments.

Those skilled in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present application.

In the embodiments provided in the present application, it should be understood that the disclosed device/network apparatus and method may be implemented in other ways. For example, the device/network apparatus embodiments described above are merely illustrative, for example, the division of modules or units is only a logical function division, and there may be other divisions in actual implementation, such as multiple units or components. It can be combined or integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separate, and the components displayed as units may or may not be physical units, that is, they may be located in one place, or they may be distributed on multiple network units. Some or all of the units may be selected according to actual needs to achieve the objectives of the solutions of the embodiments.

The above embodiments are only used to illustrate the technical solutions of the present application, not to limit them; although the present application has been described in detail with reference to the foregoing embodiments, those skilled in the art should understand that it can still be used to describe the technical solutions of the foregoing embodiments. The recorded technical solutions are modified, or some of the technical features are equivalently replaced; these modifications or replacements do not cause the essence of the corresponding technical solutions to deviate from the spirit and scope of the technical solutions of the embodiments of the present application, and shall be included within the protection scope of the present application.

What is claimed is:

1. A method for determining an extraction model of a green tide coverage ratio based on mixed pixels, comprising:
    acquiring sample truth values respectively corresponding to a plurality of target regions; wherein each target region contains water body and green tide, and each sample truth value is a truth value of the green tide coverage ratio in each target region;
    acquiring a plurality of first remote sensing data of a first satellite sensor; wherein the plurality of remote sensing data are in one-to-one correspondence with the plurality of target regions;
    determining reflection index sets respectively corresponding to the plurality of target regions according to the plurality of remote sensing data, wherein each reflection index set comprises a plurality of reflection indexes, and each reflection index is configured to represent an extracted value of the green tide coverage ratio in a pixel; and
    determining the extraction model of the green tide coverage ratio corresponding to the first satellite sensor according to the sample truth value corresponding to each of the plurality of target regions and the reflection index set corresponding to each of the plurality of target regions.

2. The method of claim 1, wherein the acquiring the sample truth value corresponding to each of the plurality of target regions comprises:
    acquiring a plurality of second remote sensing data of a second satellite sensor; wherein a spatial resolution of the second satellite sensor is higher than a spatial resolution of the first satellite sensor; and the plurality of second remote sensing data are in one-to-one correspondence with the plurality of first remote sensing data; and
    determining the sample truth value of the target region corresponding to each of the plurality of second remote sensing data.

3. The method of claim 2, wherein the determining the sample truth value of the target region corresponding to each of the plurality of second remote sensing data comprises:
    determining a color composite image of the target region corresponding to a candidate second remote sensing data and a normalized vegetation index of each pixel contained in the candidate second remote sensing data according to the candidate second remote sensing data; wherein the candidate second remote sensing data is any one of the plurality of remote sensing data; and the color composite image contains distribution information of the green tide in the target region;
    determining a type of each pixel according to a first threshold value and the normalized vegetation index of each pixel; wherein the type is mixed pixels or a pure water pixel, and an object represented by the mixed pixels simultaneously contains the water body and the green tide;
    generating an extraction result image of the target region corresponding to the candidate second remote sensing data according to the type of each pixel; wherein the extraction result image contains the distribution information of the green tide in the target region;
    comparing the extraction result image with the color composite image, and updating the first threshold value according to a comparison result to acquire a second threshold value;
    updating the extraction result image based on the second threshold value to generate an updated extraction result image, wherein distribution information of the green tide of the updated extraction result image is consistent with the distribution information of the green tide of the color composite image; and
    determining the sample truth value of the target region corresponding to the candidate second remote sensing data according to the updated extraction result image.

4. The method of claim 1, wherein the determining the extraction model of the green tide coverage ratio corresponding to the first satellite sensor according to the sample truth value corresponding to each of the plurality of target regions and the reflection index set corresponding to each of the plurality of target regions comprises:
    for each target region of the plurality of target regions, determining the green tide coverage ratio of the plurality of pixels contained in the first satellite sensor at the target region according to the sample truth value of the target region;
    generating a plurality of sample arrays of the target region according to the reflection index set of the target region and the green tide coverage ratio of the plurality of pixels;
    performing a fitting processing on the sample arrays of all the pixels in the plurality of target regions to generate a correlation relationship between the reflection index set and the green tide coverage ratio; and
    determining the extraction model of the green tide coverage ratio corresponding to the first satellite sensor according to the correlation relationship.

5. The method of claim 1, wherein the reflection index comprises a normalized vegetation index.

6. A method for determining a green tide coverage ratio, comprising:
    acquiring a plurality of third remote sensing data of a first remote sensing satellite in a region to be tested; wherein the plurality of third remote sensing data are in one-to-one correspondence with a plurality of time points, and the a duration time between the plurality of time points is greater than a third threshold value;
    determining reflection indices of a plurality of pixels contained in the region to be tested according to the plurality of third remote sensing data;
    inputting the reflection indices of the plurality of pixels into an extraction model of a green tide coverage ratio of the first remote sensing satellite to acquire corresponding a plurality of green tide coverage ratios; wherein the extraction model of the green tide coverage ratio is a model determined based on the method according to claim 1; and
    determining a change trend of the green tide coverage ratios of the region to be tested according to the plurality of green tide coverage ratios.

7. A terminal device, comprising a memory, a processor, and a computer program stored in the memory and capable of running on the processor; wherein when the processor executes the computer program, to implement steps as following:
    acquiring sample truth values respectively corresponding to a plurality of target regions; wherein each target region contains water body and green tide, and each sample truth value is a truth value of the green tide coverage ratio in each target region;

acquiring a plurality of first remote sensing data of a first satellite sensor; wherein the plurality of remote sensing data are in one-to-one correspondence with the plurality of target regions;

determining reflection index sets respectively corresponding to the plurality of target regions according to the plurality of remote sensing data, wherein each reflection index set comprises a plurality of reflection indexes, and each reflection index is configured to represent an extracted value of the green tide coverage ratio in a pixel; and determining the extraction model of the green tide coverage ratio corresponding to the first satellite sensor according to the sample truth value corresponding to each of the plurality of target regions and the reflection index set corresponding to each of the plurality of target regions;

or to implement steps as following:

acquiring a plurality of third remote sensing data of a first remote sensing satellite in a region to be tested; wherein the plurality of third remote sensing data are in one-to-one correspondence with a plurality of time points, and the a duration time between the plurality of time points is greater than a third threshold value;

determining reflection indices of a plurality of pixels contained in the region to be tested according to the plurality of third remote sensing data;

inputting the reflection indices of the plurality of pixels into an extraction model of a green tide coverage ratio of the first remote sensing satellite to acquire corresponding a plurality of green tide coverage ratios; wherein the extraction model of the green tide coverage ratio is a model determined based on the method according to claim 1; and determining a change trend of the green tide coverage ratios of the region to be tested according to the plurality of green tide coverage ratios.

8. A non-transitory computer-readable storage medium, the computer-readable storage medium storing a computer program, wherein when the computer program is executed by a processor, to implement steps as following:

acquiring sample truth values respectively corresponding to a plurality of target regions; wherein each target region contains water body and green tide, and each sample truth value is a truth value of the green tide coverage ratio in each target region;

acquiring a plurality of first remote sensing data of a first satellite sensor; wherein the plurality of remote sensing data are in one-to-one correspondence with the plurality of target regions;

determining reflection index sets respectively corresponding to the plurality of target regions according to the plurality of remote sensing data, wherein each reflection index set comprises a plurality of reflection indexes, and each reflection index is configured to represent an extracted value of the green tide coverage ratio in a pixel; and determining the extraction model of the green tide coverage ratio corresponding to the first satellite sensor according to the sample truth value corresponding to each of the plurality of target regions and the reflection index set corresponding to each of the plurality of target regions;

or to implement steps as following:

acquiring a plurality of third remote sensing data of a first remote sensing satellite in a region to be tested; wherein the plurality of third remote sensing data are in one-to-one correspondence with a plurality of time points, and the a duration time between the plurality of time points is greater than a third threshold value;

determining reflection indices of a plurality of pixels contained in the region to be tested according to the plurality of third remote sensing data;

inputting the reflection indices of the plurality of pixels into an extraction model of a green tide coverage ratio of the first remote sensing satellite to acquire corresponding a plurality of green tide coverage ratios; wherein the extraction model of the green tide coverage ratio is a model determined based on the method according to claim 1; and determining a change trend of the green tide coverage ratios of the region to be tested according to the plurality of green tide coverage ratios.

9. The method of claim 2, wherein the reflection index comprises a normalized vegetation index.

10. The method of claim 3, wherein the reflection index comprises a normalized vegetation index.

11. The method of claim 4, wherein the reflection index comprises a normalized vegetation index.

* * * * *